US005369697A

United States Patent [19]
Murray et al.

[11] Patent Number: 5,369,697
[45] Date of Patent: Nov. 29, 1994

[54] METHOD AND APPARATUS FOR AUTOMATICALLY SWITCHING BETWEEN PULSE CODE AND DTMF SIGNALS GENERATED BY A TELEPHONE

[75] Inventors: John P. Murray, Marblehead; David F. Hemmings, Manchester; David S. Gergacz, Lincoln, all of Mass.

[73] Assignee: Boston Technology, Inc., Wakefield, Mass.

[21] Appl. No.: 54,265

[22] Filed: Apr. 30, 1993

[51] Int. Cl.$^5$ .............................................. H04M 1/50
[52] U.S. Cl. ..................... 379/361; 379/359; 379/377; 379/386
[58] Field of Search .............. 379/359, 360, 361, 372, 379/377, 386, 27

[56] References Cited
U.S. PATENT DOCUMENTS

| | | | |
|---|---|---|---|
| 3,988,549 | 10/1976 | Merlin et al. | 379/360 |
| 4,233,475 | 11/1980 | Roche | 379/361 |
| 4,922,516 | 5/1990 | Butler et al. | 379/27 |
| 4,998,276 | 3/1991 | Hasegawa | 379/362 |

Primary Examiner—James L. Dwyer
Assistant Examiner—M. W. Shehata
Attorney, Agent, or Firm—Staas & Halsey

[57] ABSTRACT

Dual tone multifrequency (DTMF) signals are automatically generated by a telecommunications device after a telephone number is called. The signals generated to call the telephone number are determined by a manually operated switch indicating pulse code signal generation or dual tone multifrequency signal generation. It is determined that the telephone number has been dialed by detecting a ring-back signal, voice frequency signals, DTMF signals, or data stream signals. Alternatively, if a predetermined period of time, such as ten seconds, passes without the user pressing a number on the keypad, it may be assumed that the telephone number has been dialed. Upon detecting one of these signals or the passage of time, the telecommunications device is controlled to generate only dual tone multifrequency signals for communication with automated services, such as voicemail, telephone banking, reservation systems, etc.

11 Claims, 3 Drawing Sheets

METHOD AND APPARATUS FOR AUTOMATICALLY SWITCHING BETWEEN PULSE CODE AND DTMF SIGNALS GENERATED BY A TELEPHONE

BACKGROUND OF THE INVENTION

1. Field of the Invention

The present invention is directed to generation of signals by a telephone or other telecommunications device, and more particularly, switching between generating pulse code and dual tone multifrequency signals automatically in response to status of the telephone or signals received by the telephone.

2. Description of the Related Art

For many years telephones have been able to use dual tone multifrequency signals to instruct a switch in a central office of the public switched telephone network what number is to be connected for communications. However, this capability is not universally available and is often an extra charge. All switches are able to respond to older "pulse codes" which were generated by rotary dial telephones. Conventional telephones are available which are capable of generating either pulse codes or dual tone multifrequency (DTMF) signals. Most commonly, internal signals are generated by an input device, such as a three-by-four keypad of numerals 0–9, "*" and "#". Other input devices in common use include four-by-four keypads which add the letters A–D and keypads with the numerals 0–9 arranged in an arc with the appearance of a dial telephone. All conventional telephones which are capable of both pulse code and DTMF signaling include a manual switch to indicate which type of signals will be output from the telephone in response to activation of the keypad or other input device.

There are many types of automated services which are now available by telephone. Examples include voicemail, telephone banking, reservation systems, information services from newspapers, etc. Virtually all such systems rely upon DTMF signals to indicate caller response to audio menus. A small portion rely upon some form of voice signals, e.g., "grunt" detection. However, the vast majority of telephone owners who must, or have chosen to, indicate numbers called by using pulse code signals, have to manually switch to DTMF generation after dialing any of these automated services and then must remember to switch back to pulse code signal generation before calling a different number.

SUMMARY OF THE INVENTION

An object of the present invention is to automatically switch between pulse code and DTMF signal generation in a telecommunications device.

Another object of the present invention is to switch from pulse code signal generation to DTMF signal generation after a number has been dialed from a keypad and a signal is received indicating one of ringback, DTMF tones, data or voice.

A further object of the present invention is to switch from pulse code signal generation to dual tone multifrequency signal generation a predetermined period of time after the last digit of a number has been input by a user.

The above objects are attained by providing an apparatus for controlling external signals output to a telephone line by a signal generator in a telecommunications device in response to internal signals produced by a user of an input unit in the telecommunications device, the apparatus comprising: a detection unit, operatively connected to the telephone line, to detect at least one of status of the telecommunications device and received signals from the telephone line; and a control unit, operatively connected to the detection unit and the signal generator, to control selection between pulse code and dual tone multifrequency signals for production as the external signals corresponding to the internal signals. Preferably, the telecommunication device also includes an on/off hook detector. The control unit only indicates a change from pulse code to dual tone multifrequency signaling when the on/off hook detector indicates an off hook state, a telephone number has been dialed and the detection unit signals that the status of the telecommunications device or the signals received from the telephone line indicate that switching should occur from pulse signaling to dual tone multifrequency signaling. The detection unit may detect a predetermined period of time since an internal signal was produced, or may detect a ringback signal, voice frequency signals, DTMF signals, or data stream signals.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
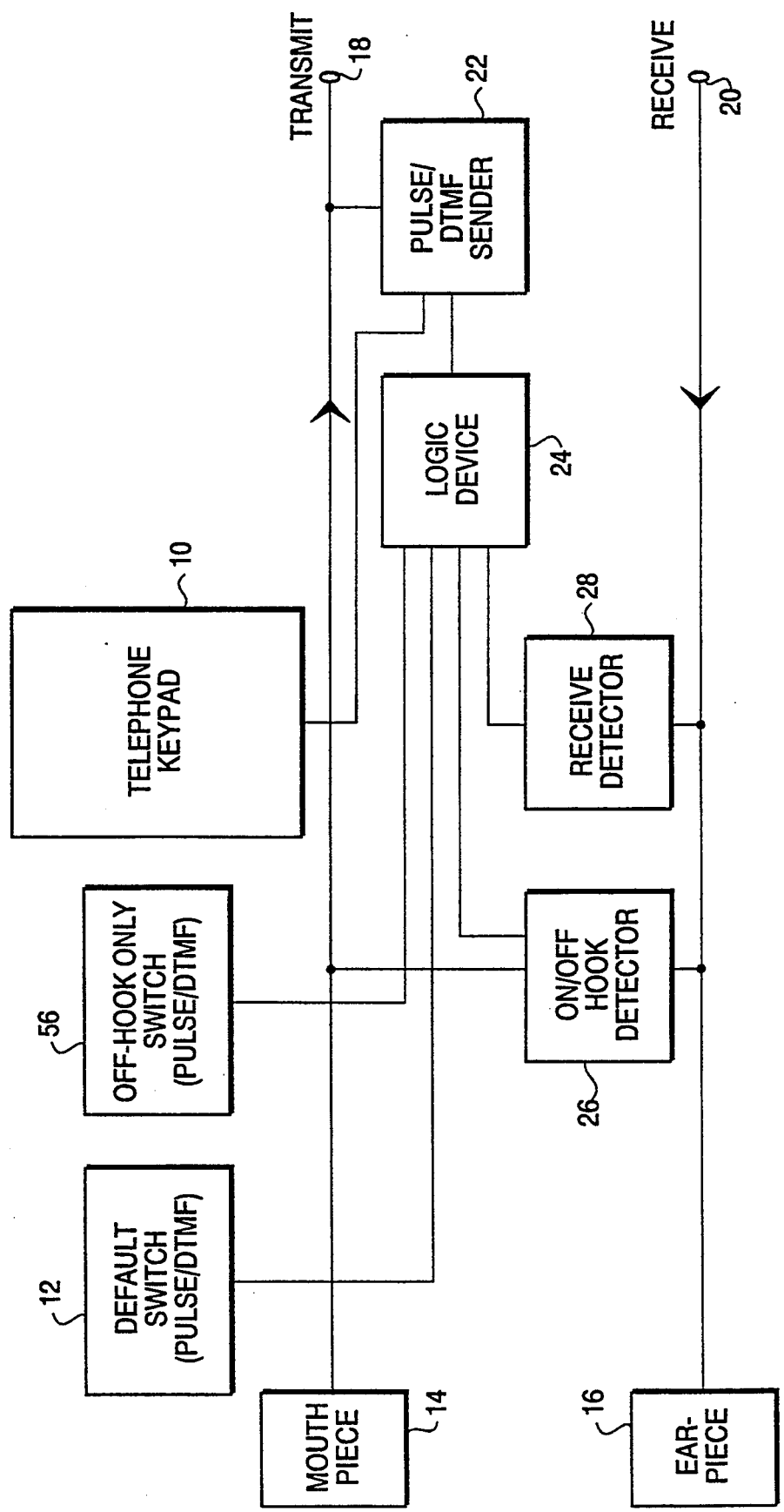
FIG. 1 is a block diagram of a first embodiment of the present invention.

As illustrated in FIG. 1, a telecommunications device according to the present invention includes a conventional input device, such as a telephone keypad 10 and a conventional manual switch 12, such as a two-position slide switch, for indicating whether the telephone numbers are to be dialed using pulse code signals or dual tone multifrequency (DTMF) signals. In addition, a conventional mouthpiece or microphone 14 and earpiece or speaker 16 which are usually coupled in a handset are connected to transmit and receive terminals 18, 20 for connection to a telephone line in a conventional manner.

The remaining components are illustrated as separate blocks in FIG. 1 and may be implemented as discrete components, combinations of discrete components, or at any level of integration, including a single integrated circuit. Such an integrated circuit may be a microprocessor which performs additional functions of the telecommunications device, or logical hardware with separately identifiable portions corresponding to the blocks illustrated in FIG. 1, or anything in between.

The first component included in the four remaining blocks is a pulse/DTMF signal generator 22 which receives internal signals generated by a keypad 10 and outputs external signals to the transmit terminal 18 for transmission over the telephone line. As described below in more detail, the default switch 12 determines whether the external signals initially produced (for dialing a telephone number) are pulse code signals or dual tone multifrequency signals. Thus, the pulse/DTMF signal generator 22 may be a conventional component such as an MC145412 Pulse/Tone Repertory Dialer, manufactured by Motorola, Inc. of Phoenix, Ariz.

Figure 3:
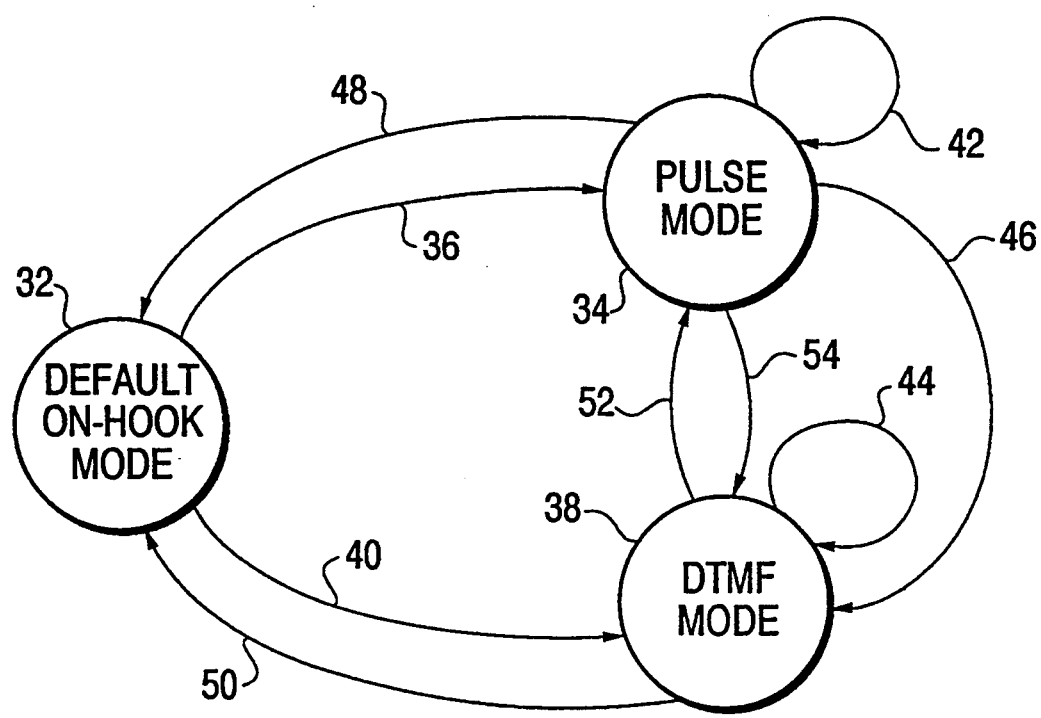
FIG. 3 is a state diagram of the control unit in the present invention.

However, unlike a conventional telecommunication device capable of pulse code and dual tone multifrequency signal generation, the signal generator 22 does not receive the indication of which type of signal to generate directly from the default switch 12, but rather from a logic device 24 which operates as a control unit for the signal generator 22 to automatically switch from pulse code signal generation to DTMF signal generation at an appropriate time which is determined as discussed below with respect to FIG. 3. In addition to the signal indicating the position of the default switch 12, the logic device 24 receives an on-hook or off-hook signal from on/off hook detector 26 and, in the first embodiment, a detection signal from receive detector 28. The on-hook and off-hook signals may be generated in a conventional manner by, e.g., a spring loaded switch which generates the off-hook signal when the handset is lifted in a conventional telephone or by detecting the absence of line power.

The receive detector 28 generates the detection signal when received signals from the telephone line connected to the receive terminal 20 indicates that a telephone number has been dialed or that the receiving end has answered. Examples of received signals which may be used to determine whether to generate the detection signal include a ringback signal; voice frequency signals, in case the phone is answered before a ringback signal is received; DTMF signals, for similar situations involving automated units connected via the telephone line; or data stream signals, such as those generated by a computer modem or a facsimile machine. A ringback signal may be detected by a gain in the decibel level of the received signals in a frequency range of, e.g., 750–2300 H hertz which includes the three most commonly used ringback signals. Voice frequency signals may be detected by a gain in the decibel level of the received signals in a frequency range, e.g., 100–3000 hertz. An MT8880 DTMF transceiver with call progress detection manufactured by Mitel Semiconductor of Kanata, Ontario, Canada or a similar component may be used to detect ringback signals or voice frequency signals. An MC145442 single chip 300 baud modem manufactured by Motorola, Inc. of Phoenix, Ariz. or a similar component may be used to detect data stream signals.

Figure 2:
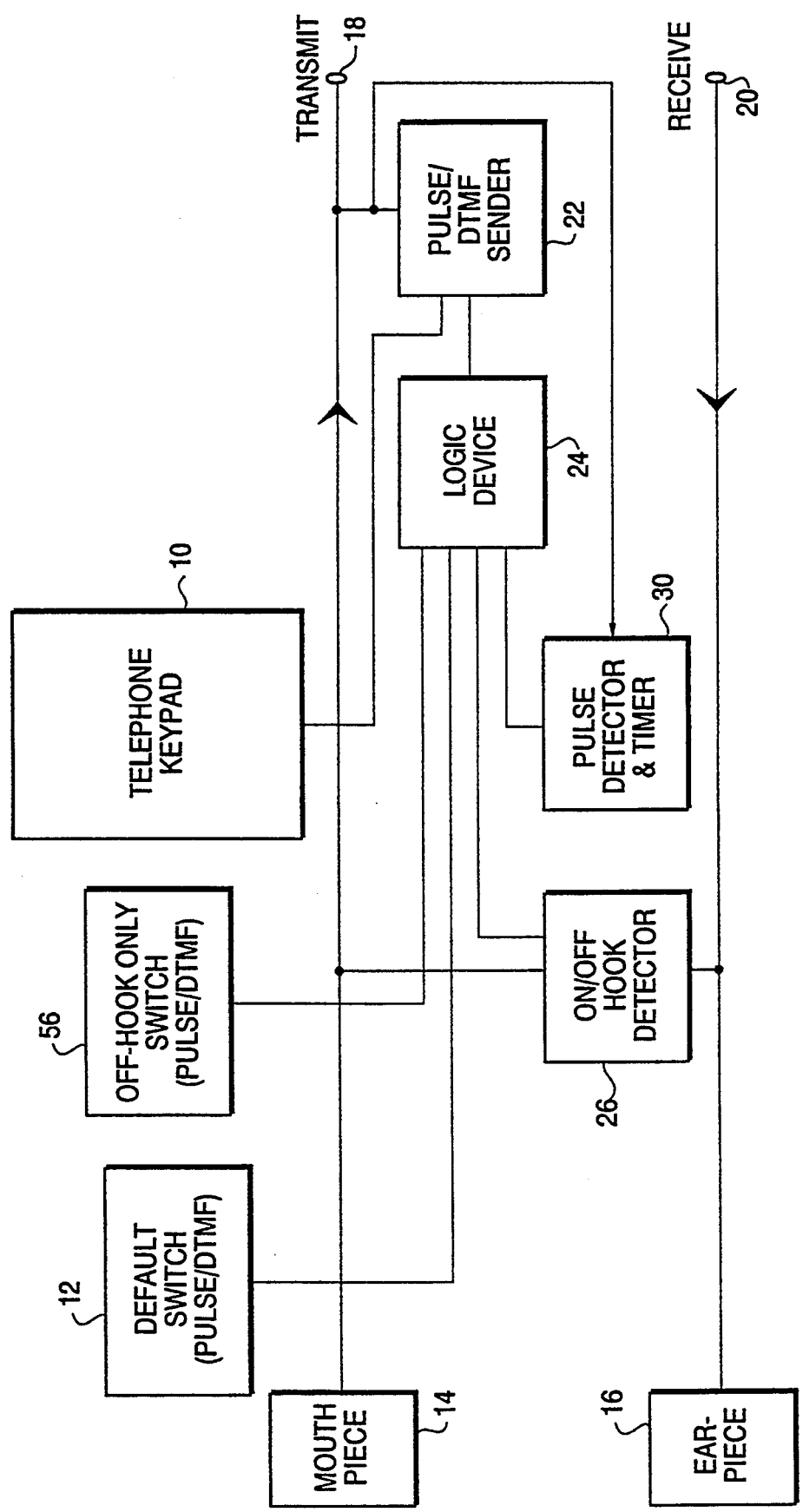
FIG. 2 is a block diagram of a second embodiment of the present invention.

As illustrated in FIG. 2, in a second embodiment the detection signal may be generated by a pulse detector and timer 30 without relying on the received signals. The pulse detector may be a simple LM339 comparitor from National Semiconductor, Canta Clara, Calif. which resets a timer, such as a LM555 timer from National Semiconductor, Santa Clara, Calif., whenever pulses are detected as being output by the signal generator 22. When the timer has not been reset for a predetermined period of time, such as 10 seconds, the detection signal is output to the control unit 24.

A state diagram of the operation of the control unit 24 is illustrated in FIG. 3. Whenever the on/off hook detector 26 outputs an on-hook signal, the control unit 24 is in the on-hook mode 32. Upon receiving an off-hook signal, the control unit 24 checks the position of the default switch 23 to determine whether to enter the pulse mode 34 via state transition 36 or DTMF mode 38 via state transition 40. While the keypad 10 generates internal signals for a telephone number to be dialed, the control unit 24 remains in the same state, i.e., pulse mode 34 if the default switch is in a first position and DTMF mode 38 if the default switch is in a second position, as indicated by arrows 42, 44. As indicated by state transition 46, when the control unit 24 is in the pulse mode 34 and the detection signal is received from receive detector 28 or pulse detector and timer 30, the control unit enters the DTMF mode 38 and instructs the signal generator 22 to produce DTMF signals for all subsequent internal signals generated by the keypad 10. When the on/off hook detector 26 outputs the on-hook signal again, the control unit 24 returns to the on-hook mode 32 via state transition 48 or 50.

As illustrated by state transitions 52 and 54, the user may manually change between pulse mode 34 and DTMF mode 38. As illustrated in FIGS. 1 and 2, a telecommunications device according to the present invention may include an off-hook only switch 56 to change from one state to the other when pressed.

The preferred embodiments disclosed above provide an alternative to automated services, such as voice mail, which have a "listen only" interface where callers only have the ability listen to new messages they have received, while old messages are automatically saved or deleted after a period of time. Such automated services could also offer sound or "grunt" detection to provide the ability to discriminate between two choices: sound (word) spoken by the user, and silence. This provides users with minimal control by using verbal responses (sounds) from their telephone. Another alternative to the preferred embodiments is an in-line DTMF tone sender which is a DTMF keypad connected in-line between the telephone line jack and the phone set, and provides DTMF tone capabilities from an existing rotary or pulse telephone set to allow interaction with DTMF automated services.

The many features and advantages of the present invention are apparent from the detailed specification, and thus it is intended by the appended claims to cover all such features and advantages of the automatic switch which fall within the true spirit and scope of the invention. Further, since numerous modifications and changes will readily occur to those skilled in the art from the disclosure of this invention, it is not desired to limit the invention to the exact construction and operation illustrated and described. For example, the present invention may be used as an add-on unit connected between a telecommunications device and a telephone line which converts between pulse code and DTMF signals automatically at an appropriate time as described. Other suitable modifications and equivalents may be resorted to, as falling within the scope and spirit of the invention.

What is claimed is:

1. An apparatus for controlling external signals output to a telephone line by a signal generator in a telecommunications device having an on/off hook detector, in response to internal signals produced by a user of an input unit in the telecommunications device, said apparatus comprising:

a detection unit, operatively connected to the telephone line, to detect at least one of status of the telecommunications device and received signals from the telephone line and to generate a detection signal upon detecting passage of a predetermined period of time since any of the internal signals were generated; and a control unit, operatively connected to said detection unit and the signal generator, to control selection between pulse code and dual tone multifrequency signals for production as the external signals corresponding to the internal signals, including instructing the signal generator to output the dual tone multifrequency signals as the external signal corresponding to subsequent internal signals when the on/off hook detector indicates that the telecommunications device is in an off-hook state and the detection signal has been generated.

2. An apparatus for controlling external signals output to a telephone line by a signal generator in a telecommunications device having an on/off hook detector, in response to internal signals produced by a user of an input unit in the telecommunications device, said apparatus comprising:

a detection unit, operatively connected to the telephone line, to detect at least one of status of the telecommunications device and received signals from the telephone line and to output a detection signal upon detection of at least one of a ringback signal, a voice frequency signal, a dual tone multifrequency signal and data stream signals, from the telephone line; and a control unit, operatively connected to said detection unit and the signal generator, to control selection between pulse code and dual tone multifrequency signals for production as the external signals corresponding to the internal signals, including instructing the signal generator to output dual tone multifrequency signals as the external signals corresponding to subsequent internal signals when the detection unit generates the detection signal after the on/off hook detector indicates that the telecommunications device is in an off-hook state and internal signals have been generated.

3. An apparatus as recited in claim 2, wherein the detection unit detects receipt of the ringback signal from the telephone line.

4. An apparatus as recited in claim 2, wherein said detection unit detects voice frequency signals from the telephone line.

5. An apparatus as recited in claim 4, wherein said detection unit determines existence of the voice frequency signals when there is a predetermined decibel gain in volume of signals received from the telephone line.

6. An apparatus as recited in claim 2, wherein said detection unit detects dual tone multifrequency signals from another unit connected via the telephone line.

7. An apparatus as recited in claim 2, wherein said detection unit detects a data stream received from the telephone line.

8. A telecommunications device for communications over a telephone line, comprising:

an input device, including a keypad, to generate internal signals other than voice signals indicative of input by a user;

a signal generator, operatively connected to said input device, to output over the telephone line one of pulse code and dual tone multifrequency signals as external signals corresponding to the internal signals; and a control unit, operatively connected to said signal generator, to control selection between the pulse code and dual tone multifrequency signals for generation as the external signals, in dependence upon at least one of status of the telecommunications device and received signals from the telephone line, including an on/off hook detector, operatively connected to said automatic switch unit, to generate an off-hook signal when said telecommunications device is in an off-hook state;

an automatic switch unit, operatively connected to the signal generator, to control selection between the pulse code and dual tone multifrequency signals for production as the external signals corresponding to the internal signals; and a detection unit, operatively connectable to the telephone line and said automatic switch unit, to detect the at least one of the status of the telecommunication device and the received signals from the telephone line and to generate the detection signal after the initial internal signals are generated by said keypad and a predetermined period of time passes without any further internal signals being generated in the off-hook state.

9. A telecommunications device for communications over a telephone line, comprising:

an input device, including a keypad, to generate internal signals other than voice signals indicative of input by a user;

a signal generator, operatively connected to said input device, to output over the telephone line one of pulse code and dual tone multifrequency signals as external signals corresponding to the internal signals; and a control unit, operatively connected to said signal generator, to control selection between the pulse code and dual tone multifrequency signals for generation as the external signals, in dependence upon at least one of status of the telecommunications device and received signals from the telephone line, including a detection unit, operatively connectable to the telephone line, to detect the at least one of the status of the telecommunications device and the received signals from the telephone line and to output a detection signal upon detection of one of a ringback signal, a voice frequency signal, a dual tone multifrequency signal and data stream signals;

an automatic switch unit, operatively connected to said detection unit and the signal generator, to control selection between the pulse code and dual tone multifrequency signals for production as the external signals corresponding to the internal signals;

an on/off hook detector, operatively connected to said automatic switch unit, to generate an off-hook signal when said telecommunications device is in an off-hook state; and means for instructing said signal generator to output the dual tone multifrequency signals as the external signals corresponding to subsequent internal signals when the detection signal is generated after the off-hook signal and after initial internal signals are generated by said keypad.

10. A telecommunications device for communications over a telephone line, comprising:

an input device, including a keypad, to generate internal signals other than voice signals indicative of input by a user;

a signal generator operatively connected to said input device, to output over the telephone line one of pulse code and dual tone multifrequency signals as external signals corresponding to the internal signals;

a control unit, operatively connected to said signal generator, to control selection between the pulse code and dual tone multifrequency signals for generation as the external signals, in dependence upon at least one of status of the telecommunications device and received signals from the telephone line, including a detection unit, operatively connectable to the telephone line, to detect the at least one of the status of the telecommunications device and the received signals from the telephone line;

an automatic switch unit, operatively connected to said detection unit and the signal generator, to control selection between the pulse code and dual tone multifrequency signals for production as the external signals corresponding to the internal signals; and an on/off hook detector, operatively connected to said automatic switch unit, to detect when the telecommunications device is in an off-hook state and to send an off-hook signal to said automatic switch unit upon detecting the off-hook state; and a manual switch, operatively connected to said automatic switch unit, having at least first and second positions selectable by the user to indicate generation of the pulse code signals and the dual tone multifrequency signals, respectively, as the external signals corresponding to initial internal signals produced immediately following the off-hook signal, said automatic switch unit instructing said signal generator to output only dual tone multifrequency signals when said manual switch is in the second position and instructs said signal generator to switch from generation of the pulse code signals to the dual tone multifrequency signals upon generation of the detection signal when said manual switch is in the first position.

11. A method of automatically outputting to a telephone line dual tone multifrequency signals generated by a telecommunications device manually switchable between generating pulse code and dual tone multifrequency signals, said method comprising the steps of:

(a) detecting an off-hook state in the telecommunications device;

(b) detecting non-voice input by a user of the telecommunications device to produce initial external signals output to the telephone line;

(c) detecting at least one of a ring-back signal from the telephone line, voice frequency signals from the telephone line, tone signals from the telephone line, data stream signals from the telephone line and a predetermined period of time without generation of the external signals, after said detecting in step (a) is followed by said detecting in step (b); and (d) automatically producing dual tone multifrequency signals after said detecting in step (c) regardless of whether the pulse code signals or the dual tone multifrequency signals are generated prior to said detecting in step (c).

* * * * *